United States Patent

[11] 3,552,590

| [72] | Inventor | August A. Zachmeier<br>Joppa, Md. |
|---|---|---|
| [21] | Appl. No. | 676,136 |
| [22] | Filed | Oct. 18, 1967 |
| [45] | Patented | Jan. 5, 1971 |
| [73] | Assignee | AAI Corporation<br>Cockeysville, Md.<br>a corporation of Maryland |

[54] MAGAZINE FOR USE WITH AN INTEGRATED CIRCUIT TEST APPARATUS
2 Claims, 8 Drawing Figs.

[52] U.S. Cl. .................................................. 214/301;
 206/56; 221/309
[51] Int. Cl. .................................................. B65b 21/02
[50] Field of Search ........................................... 224/15;
 206/56DF, 56A—F, 65F; 133/1, 6; 221/309, 310,
 6; 214/304, 301

[56] References Cited
UNITED STATES PATENTS

| 523,886 | 7/1894 | Durst............................ | (224/15)UX |
| 571,973 | 11/1896 | Johnson....................... | (224/15)UX |
| 573,251 | 12/1896 | Webster....................... | 133/6 |
| 710,324 | 9/1902 | Hylard.......................... | (224/15)UX |
| 1,637,549 | 8/1927 | Chandler...................... | 133/1 |
| 1,739,780 | 12/1929 | Buhrke......................... | (224/15)UX |
| 1,981,975 | 11/1934 | Weimar........................ | 133/6X |
| 2,122,003 | 6/1938 | Cooper......................... | 224/15 |
| 2,149,099 | 2/1939 | Phinney et al................ | 221/6 |
| 2,540,572 | 2/1951 | Engeln et al................. | (214/8.5K)UX |

Primary Examiner—Hugo O. Shulz
Attorney—Reginald F. Pippin, Jr.

ABSTRACT: A magazine and an environmental test chamber and transport apparatus with which it may be used are disclosed for sequentially and automatically testing a plurality of packaged integrated circuits. A plurality of packaged integrated circuits loaded in a magazine are fed into an input section of the test apparatus and onto a transport tape when the loaded magazine is inserted into the input section. After being fed onto the transport tape, the movement of the tape carries the packaged integrated circuits into a nonconductive, temperature controlled, liquid bath and into a test assembly which is submerged in the bath. Upon entering the test assembly, each packaged integrated circuit undergoes a series of computer-controlled tests to determine its electrical characteristics. When the tests are completed, the transport tape carries the packaged integrated circuits from the test assembly and out of the liquid bath to a discharge section of the test apparatus where they are ejected into an empty magazine inserted into the discharge section of the test apparatus.

August A. Zachmeier
INVENTOR

ATTORNEY

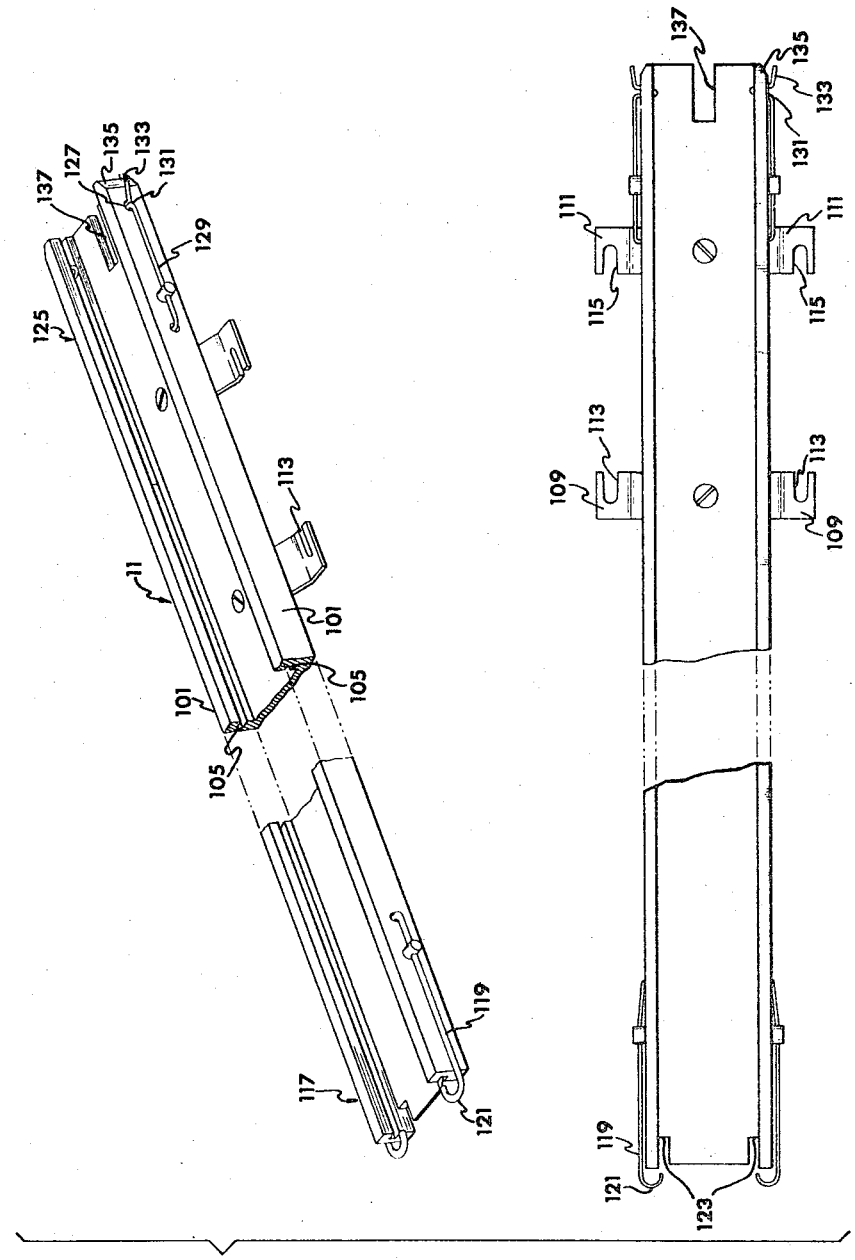

August A. Zachmeier

INVENTOR

ATTORNEY

August A. Zachmeier
INVENTOR

ATTORNEY

MAGAZINE FOR USE WITH AN INTEGRATED CIRCUIT TEST APPARATUS

DISCLOSURE

This invention relates to a magazine adapted to contain a plurality of packaged integrated circuits in longitudinal alignment and which may suitably be used with an apparatus for automatically testing the packaged integrated circuits in a controlled temperature environment.

In the automatic testing of packaged integrated circuits, it is desirable to be able to properly feed large numbers of packaged integrated circuits into a testing apparatus and to collect them when the testing process is completed in such a manner as to minimize delays in the automatic testing operation of the apparatus resulting from the movements involved in the feeding and collecting operations, and thereby maximize the number of packaged integrated circuits processed by the testing apparatus within a given period of time. Furthermore, it is desirable to have a container or magazine in which packaged integrated circuits can be securely and controllably stored for further processing and yet be easily and selectively removable therefrom.

Accordingly, it is a feature of this invention to provide a container which can hold a plurality of packaged integrated circuits, feed them into the test apparatus, and collect them when the testing process is completed.

In accordance with the present invention, there is provided a magazine, relatively long with respect to its width and adapted to contain a plurality of packaged integrated circuits in longitudinal alignment, having longitudinal slots formed in the sides thereof, a stop mechanism at one end which is adapted to normally retain the packaged integrated circuits in the magazine yet permit them to be serially fed from the magazine upon its insertion into the input section of the apparatus, and a control mechanism at the opposite end which is adapted to permit packaged integrated circuits to enter the magazine and be retained therein upon insertion into the discharge section of the apparatus.

Still other objects, features, and attendant advantages will become apparent to those skilled in the art from a reading of the following detailed description of a preferred physical embodiment constructed in accordance with the invention, taken in conjunction with the accompanying drawing, wherein:

FIG. 2 shows the details of the preferred embodiment of a magazine constructed in accordance with the present invention.

Figure 3A:
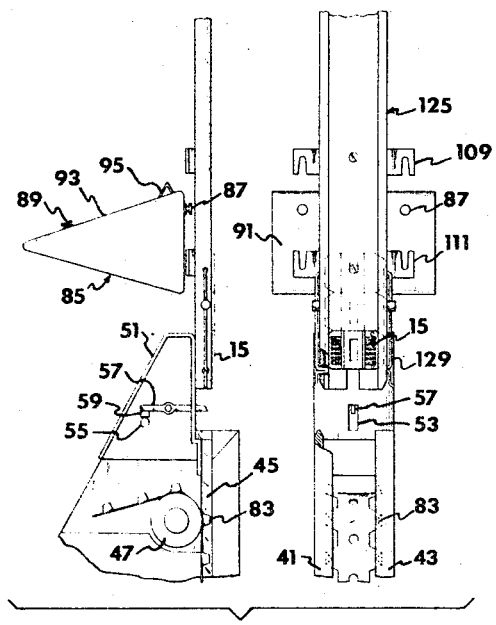
Figure 3B:
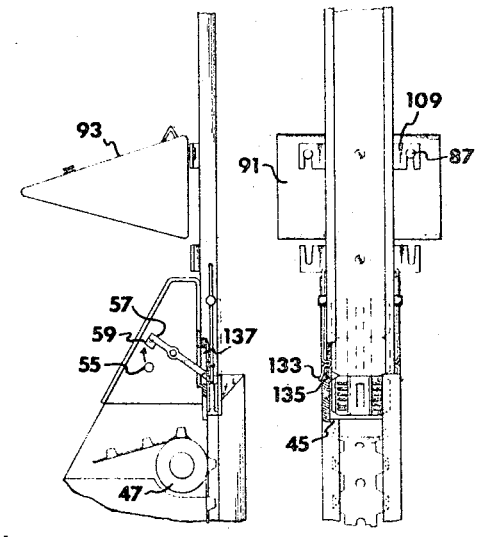
Figure 3C:
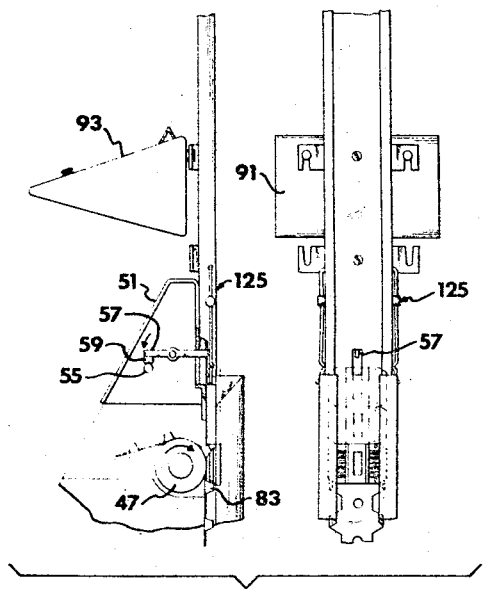

FIGS. 3a, 3b, and 3c show the details of the upper portion of the input section of the integrated circuit test apparatus and illustrates schematically the manner in which packaged integrated circuits are fed into the input section from a loaded magazine inserted into the input section.

Figure 4A:
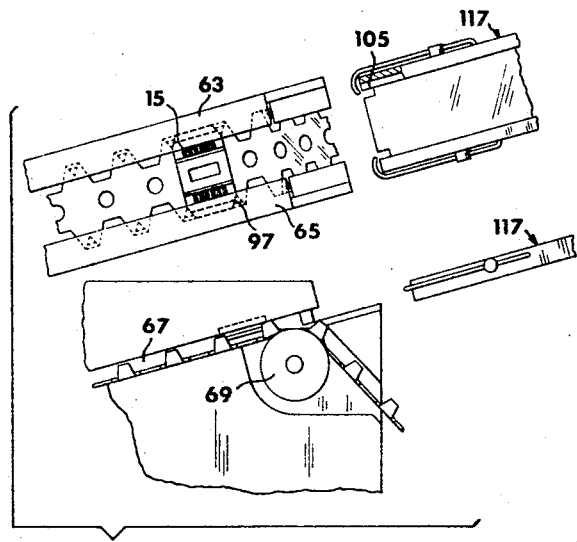
Figure 4B:
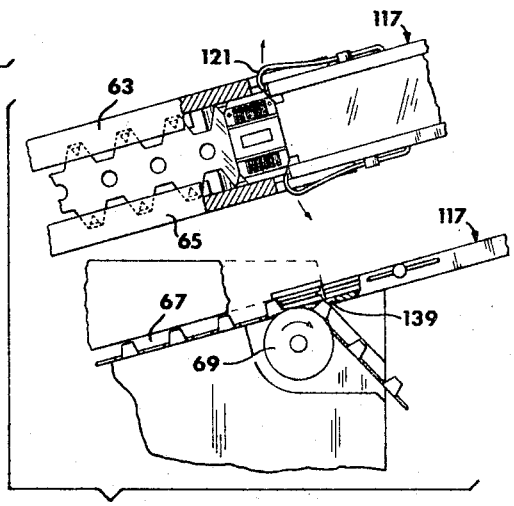
Figure 4C:
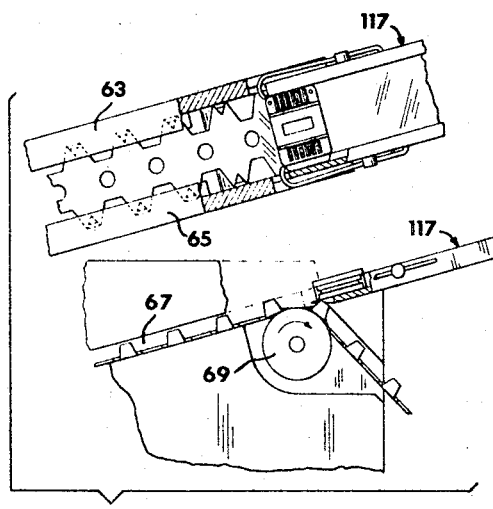

FIGS. 4a, 4b and 4c show the details of the upper portion of the discharge section of the integrated circuit test apparatus and illustrates schematically the manner in which packaged integrated circuits are ejected from the discharge section into an empty magazine inserted into the discharge section.

Figure 1:
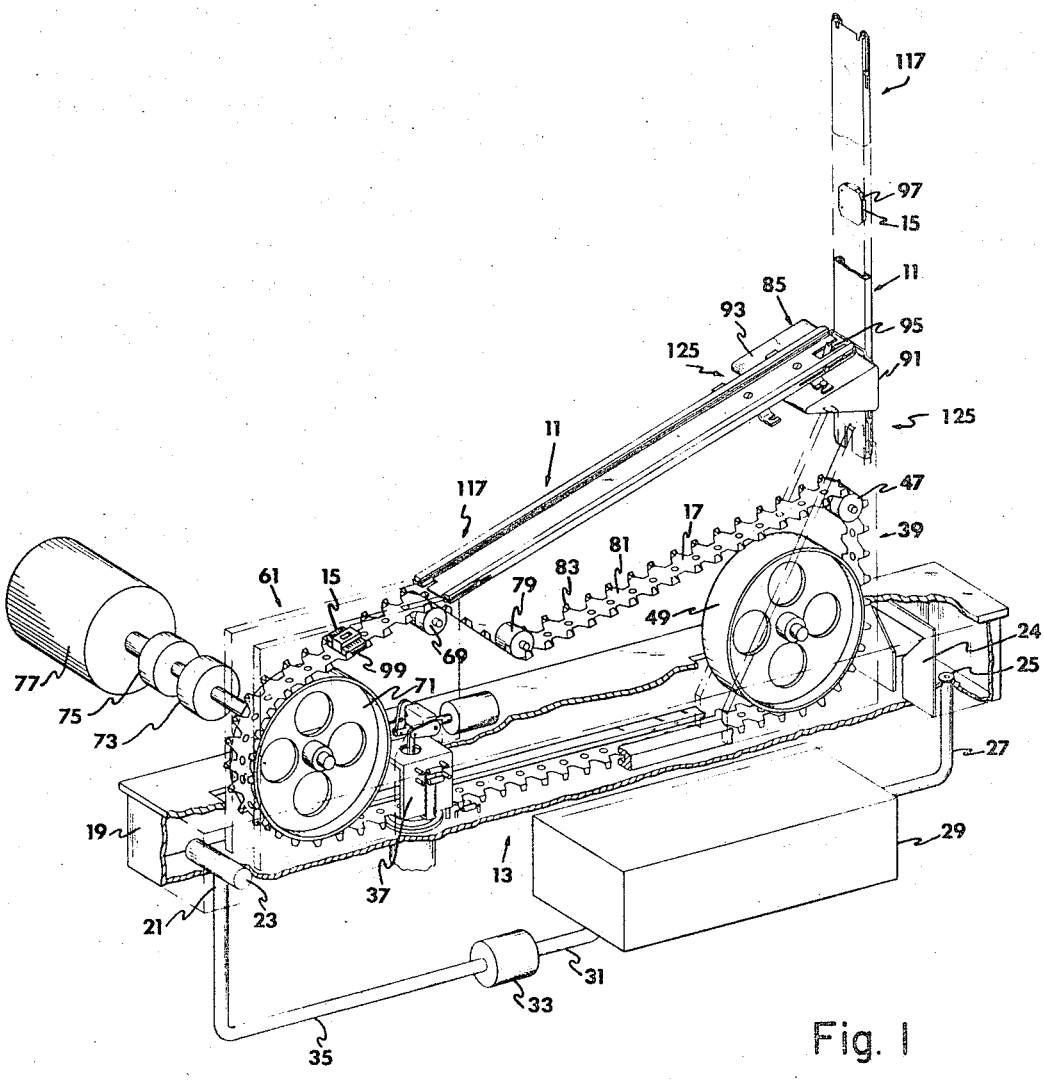
FIG. 1 shows a preferred embodiment of a magazine, constructed in accordance with the present invention, being used with a schematic, orthographically illustrated environmental test chamber and transport apparatus, having an input section and a discharge section, which is suitable for automatically testing a plurality of packaged integrated circuits.

Referring generally to the FIGS. of the drawings, in FIG. 1 is shown two identical magazines, generally indicated at 11, embodying the principles of the present invention, and being used with an environmental test chamber and transport apparatus, or more generally a test apparatus, generally indicated at 13, which is suitable for automatically testing a plurality of packaged integrated circuits. The general arrangement illustrated includes a vertically positioned magazine 11 feeding by gravity a series of packaged integrated circuits, generally indicated at 15, onto an endless transport tape 17 which carries the packaged integrated circuits 15 through an environmental conditioning bath in a tank 19 to and past a test station, after which the transport tape 17 carries the packaged integrated circuits 15 to an output section at which is positioned a further identical magazine 11 for discharge assistance and receipt of the tested packaged integrated circuits 15.

The environmental test chamber includes a tank 19 adapted to hold a fluid bath and having a fluid inlet 21 at one end of the tank 19 with a fluid distributing head 23 attached thereto, a drain 25 at the opposite end of the tank 19 and a slotted weir 24 mounted therebetween for controlling the level of a liquid bath in the tank 19. The fluid bath may be a suitable nonconductive, substantially nonreactive, low residue fluid having a wide liquid temperature range of approximately −55° C. to +150° C. and may preferably be Freon E series.

Exterior to the tank 19 and connected to the drain 25 by a conduit 27 is a temperature-controlled fluid reservoir 29 which, in turn, is connected by a conduit 31 to a pump 33. The pump 33 is connected by a conduit 35 to the fluid inlet 21 and distributing head 23 of the tank 19 for supplying temperature-controlled fluid to the tank 19 during the operation of the environmental test apparatus 13. Mounted inside the tank 19 and adapted to be partially submerged by the nonconductive, temperature-controlled fluid contained in the tank 19 during the operation of the apparatus is a test assembly, generally indicated at 37, which is adapted to receive a packaged integrated circuit 15 and enable a test or a series of tests to be performed on it.

At the drain end of the tank 19, as particularly shown in FIG. 3, is the input section, generally indicated at 39, of the test apparatus 13 into which packaged integrated circuits 15 are fed. The input section 39 includes a pair of parallel plates 41 and 43, beveled on both sides at the top and each having a narrow, vertically extending groove which together form a chute through which packaged integrated circuits 15 can be fed into the test apparatus 13. Rotatably mounted between the parallel plates 41 and 43 are an idler wheel 47 and an idler drum 49, the former being mounted above the latter.

At the top of the parallel plates 41 and 43 is a cover 51 having a vertical slot 53 in the portion between the right-hand edges of the parallel plates 41 and 43. Mounted on the inside surface of the cover 51 is a magnetically actuated reed switch 55 which is connected in controlling relationship to a lamp, now shown, that is unenergized when the reed switch 55 is unactuated. Pivotally mounted between the parallel plates is an arm 57, one end of which extends through the slot 53 in the cover 51, and the other end of which has a magnet 59 attached thereto. The normal position of the arm 57 is determined by the upward extent of the vertical slot 53 in the cover 51 which is sufficient to bring the magnet 59 attached to the opposite end of the arm 57 into actuating proximity with the reed switch 55. A plurality of aligned, packaged integrated circuits 15 entering the input section 39 of the apparatus 13 will normally depress the portion of the arm 57 protruding through the cover 51, as shown in FIG. 3b, thereby deenergizing the lamp. Consequently, the energization of the lamp indicates that packaged integrated circuits are not being fed into the input section 39, and since a magazine 11 is to be used to feed packaged integrated circuits 15 into the input section 39, the arm 57 may be designated an Empty Magazine Sensor.

At the inlet end of the tank 19, as particularly shown in FIG. 4, is the output or discharge section, generally indicated at 61, of the test apparatus 13 from which packaged integrated circuits 15 are ejected. The output section 61 includes a pair of parallel plates 63 and 65, each having a narrow, upwardly extending groove 67 which forms a chute through which packaged integrated circuits are ejected from the test apparatus 13. At the upper right-hand corner of the parallel plates 63 and 65 is formed an open notched portion into which the chute opens that is adapted to receive the end of a magazine 11 inserted into the discharge section 61. Rotatably mounted between the parallel plates 63 and 65 are an idler wheel 69 and a drive drum 71, the former being mounted above and to the right of the latter. The drive drum 71 is connected through an electrically actuated brake 73 and clutch 75 to a continuously running motor 77 which drives the transport tape 17. To the right of the parallel plates 63 and 65 and vertically positioned between the idler wheel 69 and the drive drum 71 is a rotatably mounted and resiliently biased tension idler wheel 79 which keeps the transport tape 17 taut.

The endless transport tape 17 is formed with a series of integral, spaced, lateral protrusions 81, that are bent and folded to form upwardly protruding ears 83 which are adapted to hold packaged integrated circuits 15 therebetween. The transport tape 17 is wrapped around the various wheels and drums of the test apparatus so as to move over the idler wheel 47 at the input section 39, down and under the idler drum 49, along the bottom of the tank 19, through the test assembly 37, under and around the drive drum 71, up and over the idler wheel 69 at the discharge section 61, under the resiliently biased tension idler 79 and back to the idler wheel 47 at the input section 39.

Above the input section 39 of the test apparatus 13 is a right-angled, wedge-shaped bracket, generally indicated at 85, supported by any suitable means and having two pairs of studs 87 and 89, attached to both the vertical surface 91 and the sloping surface 93, which serves the dual purpose of supporting a magazine 11 inserted into the input section 39 of the test apparatus 13 in a proper vertical position to facilitate the feeding of packaged integrated circuits 15 from the magazine 11 into the input section 39 while at the same time supporting a magazine 11 inserted into the discharge section 61 of the test apparatus 13 in a proper upwardly sloping position to facilitate the entrance into the magazine 11 of packaged integrated circuits 15 ejected from the discharge section 61. Protruding through the sloping surface 93 of the wedge-shaped member 85 is the upwardly extending arm 95 of a limit switch which is operatively connected in a controlling manner to the electric motor 77 and serves to turn off the motor 77 and hence stop the movement of the transport tape 77 when a magazine 11 inserted into the discharge section 61 becomes fully loaded with packaged integrated circuits.

On the transport tape 17 in the discharge section 61 is a typical conventional carrier-packaged flat pack type integrated circuit assembly, generally indicated at 15, which may be stored, fed into the input section 39, and collected from the output section 61 by a magazine 11, constructed according to the present invention. The overall carrier package assembly, including the integrated circuit arrangement carried thereby, is generally referred to herein as a packaged integrated circuit, and has a generally rectangular configuration with beveled corners 97 and laterally protruding lugs 99 on each side and a pair of holes on one side. The flat pack-type integrated circuit arrangement is mounted in such a manner that the connecting terminals of the flat pack circuit are disposed in an exposed position between separator guides on one surface of the carrier package assembly. In some instances, one of the laterally protruding lugs 99 may be thicker than the other to distinguish one set of integrated circuit terminals from the other.

From the foregoing it will be appreciated that it is desirable to have a container or a magazine 11 which is capable of properly feeding a plurality of packaged integrated circuits 15 into the test apparatus 13 when inserted into the input section 39, yet also adapted to receive and retain a plurality of packaged integrated circuits 15 ejected from the test apparatus 13 when inserted into the discharge section 61. A preferred embodiment of a magazine 11 constructed in accordance with this invention is shown in FIG. 2 and has a boxlike body which is open at the top and the ends. The sides of the boxlike body have longitudinally extending slots 105 formed therein and are spaced sufficiently apart to accommodate a packaged integrated circuit 15 with the lugs 99 thereof extending laterally a length which is adapted to accommodate a relatively large number of packaged integrated circuits 15 and permit them to be fed into the input section 39, thereby minimizing the interruptions in the testing process necessitated by the movements involved in feeding packaged integrated circuits 15 into the input section 39. The width of the longitudinally extending slots 105 may be different from each other to accommodate packaged integrated circuits 15 having laterally protruding lugs of different thicknesses to distinguish one set of integrated circuit terminals from the other, and thus ensure that the packaged integrated circuits are properly aligned in the magazine 11 and consequently fed into the test apparatus 13 in the correct position for testing. Attached to the bottom of the boxlike body are two pairs of feet 109 and 111, each having lateral openings, 113 and 115, facing toward each other which are adapted to engage the two pairs of studs 87 and 89, in the wedge-shaped bracket 85 so as to support the magazine 11 when it is inserted into either the input section 39 or the output section 61 of the test apparatus 13.

At one end of the magazine, which may be designated the input end and is generally indicated at 117, are a pair of control springs 119 each having a bend 121 at the end thereof which are attached to each side of the magazine 11 to permit only unidirectional movement of the packaged integrated circuits 15 into the magazine 11. At this end of the magazine 11, the bottom of the boxlike body has a beveled portion 139 and a pair of notches 123 formed therein which permit the ears 83 of the transport tape 17 to pass therethrough and thereby enable the input end of the magazine 11 to be inserted into the discharge section 61 closely adjacent to the place where the tape 17 bends around the idler wheel 69 so that the bottom of the magazine 11 serves as a camming device to facilitate removal of the packaged integrated circuits from the transport tape 17 into the magazine 11 with very slight or no change in direction.

At the opposite end of the magazine which may be designated the output end, and is generally indicated at 125, are a pair of stop springs 129, each having a bend 131 and an outwardly extending end 133 which are attached to each side of the magazine. In each side of the magazine are formed a pair of apertures 127 which open into the longitudinally extending grooves 105 and through which the bends 131 in the stop springs 129 extend to engage the beveled corners 97 of a packaged integrated circuit to hold it in the magazine. The free ends 133 of the stop springs 129 are adapted to engage the beveled top outer portions of the plates 41 and 43 at the input section 39 of the test apparatus 13 when the magazine 11 is inserted therein to spread the springs apart and force the bends 131 thereof out of the longitudinally extending slots 105. At this end of the magazine 11, the corners 135 are beveled inwardly to facilitate the insertion of the magazine 11 into the input section 39 of the test apparatus 13 where it will engage inner beveled top portions of the plates 41 and 43. Furthermore, the bottom of the magazine 11 has a slot 137 to permit either the arm 57 of the Empty Magazine Sensor to extend into the path of the packaged integrated circuits being fed into the input section 39 of the test apparatus 13 or alternatively to permit the arm 95 of the Magazine Full switch to extend into the path of the packaged integrated circuits being collected from the discharge section 61 of the test apparatus 13.

In operation, an empty magazine 11 is inserted into the discharge section 61 of the test apparatus 13 in such a manner that the input end 117 of the magazine is received into the open notched portion at the open end of the chute in the parallel plates 63 and 75. In addition, the lateral openings 115 in the pair of shoes 111 engage the pair of studs 89 attached to the sloping surface 93 of the wedge-shaped bracket 85 to hold the empty magazine 11 in a fixed, sloping position and the arm 95 of the Magazine Full switch protrudes through the slot 137 in the bottom of the magazine 11 at the output end 125. Another magazine 11, loaded with packaged integrated circuits 15, is inserted into the input section 39 of the test apparatus 13 in such a manner that the inwardly beveled corners 135 of the output portion 125 engage the outwardly beveled opening of the slots 45 forming the chute in the input section 39 of the test apparatus 13. In addition, the lateral openings 113 in the pair of shoes 109 engage the studs 87 attached to the vertical surface 91 of the wedge-shaped bracket 85 to lock and hold the loaded magazine 11 in a fixed vertical position.

Prior to the insertion of the loaded magazine 11 into the input section 39, the packaged integrated circuits 15 are retained in the magazine 11 by the bends 131 in the stop springs 129 which protrude through the apertures 127 in the sides and engage the forward beveled corners 97 of the leading packaged integrated circuits. In addition, the arm 57 of the Magazine Empty Sensor protrudes through the slot 53 in the cover 51 at the top of the input section 39 and engages the upper portion thereof, thereby bringing the magnet 59 into actuating the proximity with the reed switch 55 to energize a lamp which indicates either that there is no magazine 11 in the input section 39 of the test apparatus 13 or that the magazine is empty.

Upon insertion of the loaded magazine 11 into the input section 39, the arm 51 is pivoted clockwise, thereby moving the magnet 59 out of actuating proximity with the reed switch 55 to cause the lamp to be deenergized. In addition, the outwardly extending ends 133 of the stop springs 129 engage the plates 41 and 43 of the input section 39, thereby causing the springs 129 to be spread apart to remove the bends 131 therein from engagement with the beveled corners 97 of the leading packaged integrated circuit to permit the packaged integrated circuits 15 in the loaded magazine 11 to be gravity fed through the chute of the input section 39 and onto the transport tape 17 which carries them to the test assembly 37 for testing. As the last packaged integrated circuit is fed into the chute of the input section, it releases the depressed arm 57 of the Empty Magazine Sensor, thereby permitting it to pivot counterclockwise and bring the magnet 59 into actuating proximity with the reed switch 55 to cause the lamp to be energized, thus indicating that the magazine 11 is empty. Upon noticing the lighted lamp, the operator can remove the emptied magazine 11 and insert another loaded magazine 11, as previously described.

After the packaged integrated circuits have been fed onto the transport tape 17, the movement of the tape 17 carries them from the input section 39 and into the nonconductive, substantially nonreactive temperature-controlled liquid bath where they will move toward the test assembly 37 along a temperature conditioning and stabilizing path, whereby the temperature of the packaged integrated circuits will be changed to that of the bath. Upon entering the test assembly 37, each packaged integrated circuit 15 undergoes a series of computer-controlled tests to determine its electrical characteristics. After the tests have been completed, the movement of the transport tape 17 carries the packaged integrated circuits 15 from the test assembly 37, out of the liquid bath, and into the discharge section 61 of the test apparatus 13.

After the packaged integrated circuits 15 have entered the test assembly 37, the movement of the transport tape 17 carries them through the upwardly extending chute to the empty magazine 11 inserted into the discharge section 61. As each packaged integrated circuit moves through the chute, the forward beveled corners 97 engage the bent ends 121 of the control springs 119 of the magazine 11 and spread them apart as the packaged integrated circuit is pushed into the magazine 11 by the ears 83 of the transport tape 17 engaging the rearward beveled corners 97 of the packaged integrated circuit. As each packaged integrated circuit is pushed toward the magazine 11, the ears 83 of the transport tape 17 that were engaging the forward beveled corners 97 of the packaged integrated circuit pass through the notches 123 in the bottom of the magazine 11 which facilitate the camming of the packaged integrated circuits from the transport tape 17 by the beveled bottom of the magazine 11. When the packaged integrated circuit is pushed into the magazine 11 sufficiently so that the ends of the springs 119 engage the rearward beveled corners 97 of the packaged integrated circuits, the springs 119 move toward each other and assist the entrant movement by pulling the packaged integrated circuit further into the magazine as well as retaining it therein and preventing it from sliding back onto the transport tape 17. This process is repeated as each packaged integrated circuit is pushed into the magazine 11 until it becomes fully loaded, whereupon the first or leading packaged integrated circuit to enter the magazine 11 engages the arm 95 of the Magazine Full Switch, which protrudes from the sloping surface 93 of the wedge-shaped bracket 85 and through the slot 137 formed in the output end of the magazine 11, which turns off the motor 77 and stops the movement of the transport tape 17.

While the invention has been illustrated and described with respect to a single preferred embodiment, it will be apparent to those skilled in the art that various embodiments, modifications and improvements may be made without departing from the scope and spirit of the invention. Accordingly, it is to be understood that the invention is not to be limited by the illustrated embodiment, but only by the scope of the appended claims.

I claim:

1. A magazine for receiving, storing and discharging electrical circuit packages each containing an electrical circuit having a physically asymmetrical circuit configuration, comprising:

a boxlike body having a length greater than its width and with first and second open ends for passage of electrical circuit packages therethrough;

first and second retaining means at the first and second open ends respectively of said boxlike body to enable unidirectional passage of electrical circuit packages therethrough and normally adapted to retain the electrical circuit packages within said boxlike body; and differential lateral guide means formed in said boxlike body to align therein a series of physically asymmetrical electrical circuit packages each containing an electrical circuit having a physically asymmetrical circuit configuration spatially fixed with respect to the physically asymmetrical package to ensure the same and common alignment of the physically asymmetrical circuit configurations;

said boxlike body being beveled inwardly toward said first opening to enable said first opening of said boxlike body to be closely and tangentially positioned at an arcuate portion of an endless conveyor and effectively forming a cam to facilitate the transfer of electrical circuit packages from the endless conveyor and their passage into said boxlike body without a change in direction;

at least a single notch formed in said boxlike body at said first open end and adapted to permit protruding portions of an endless conveyor to pass therethrough to enable said first opening of said boxlike body to be positioned closely adjacent to the endless conveyor;

a slot formed in said boxlike body at said second open end and adapted to receive a sensor to detect the presence of electrical circuit packages in said boxlike body whereby upon receipt of electrical circuit packages through said first opening into said boxlike body the sensor will detect a fully loaded condition and upon the discharge of electrical circuit packages through said second opening from said boxlike body the sensor will detect an empty condition;

means attached to said boxlike body and adapted to enable it to be fastened to apparatus in a position to facilitate the passage of electrical circuit packages through said first opening into said boxlike body; and means attached to said boxlike body and adapted to enable it to be fastened to an apparatus in a position to facilitate the discharge of electrical circuit packages from said boxlike body through said second opening.

2. A magazine for receiving, storing and discharging electrical circuit packages each containing an electrical circuit having a physically asymmetrical circuit configuration, comprising:

a boxlike body having a length greater than its width and with first and second open ends for passage of electrical circuit packages therethrough;

first and second retaining means at the first and second open ends respectively of said boxlike body to enable unidirectional passage of electrical circuit packages therethrough and normally adapted to retain the electrical circuit packages within said boxlike body;

differential lateral guide means formed in said boxlike body to align therein a series of physically asymmetrical electrical circuit packages each containing an electrical circuit having a physically asymmetrical circuit configuration spatially fixed with respect to the physically asymmetrical package to insure the same and common alignment of the physically asymmetrical circuit configurations;

said boxlike body being beveled inwardly toward said first opening to enable said first opening of said boxlike body to be closely and tangentially positioned at an arcuate portion of an endless conveyor and serve as a cam to facilitate the transfer of electrical circuit packages from the endless conveyor and their passage into said boxlike body without a change in direction;

at least a single notch formed in said boxlike body at said first open end and adapted to permit protruding portions of an endless conveyor to pass therethrough to enable said first opening of said boxlike body to be positioned closely adjacent to the endless conveyor;

a slot formed in said boxlike body at said second open end and adapted to receive a sensor to detect the presence of electrical circuit packages in said boxlike body whereby upon receipt of electrical circuit packages through said first opening into said boxlike body the sensor will detect a fully loaded condition and upon the discharge of electrical circuit packages through said second opening from said boxlike body the sensor will detect an empty condition;

means attached to said boxlike body and adapted to enable it to be fastened to apparatus in a position to facilitate the passage of electrical circuit packages through said first opening into said boxlike body;

means attached to said boxlike body and adapted to enable it to be fastened to an apparatus in a position to facilitate the discharge of electrical circuit packages from said boxlike body through said second opening;

said first retaining means including at least a single spring in a position normally blocking the passage of electrical circuit packages through said first opening in said boxlike body with a camming surface adapted to be engaged by an electrical circuit package entering said boxlike body to effect the lateral movement of a portion of the retaining spring to enable the electrical circuit package to pass through said first opening into said boxlike body and having a portion adapted to engage a camming surface of an electrical circuit package and effect a lateral movement to exert a force against the electrical circuit package that assists the unidirectional passage of the package into said boxlike body;

said boxlike body having an aperture formed therein closely adjacent to said second opening of said boxlike body;

said second retaining means including at least a single spring having a portion thereof normally protruding through said aperture formed in said boxlike body to prevent electrical circuit packages from passing through said second opening of said boxlike body and having a camming surface adapted to engage a portion of an electrical circuit package receiving object to effect the lateral movement of the spring from the blocking position to enable electrical circuit packages to be discharged from said boxlike body into the receiving object;

said differential lateral guide means comprising:

first differential guideways formed on two opposite sides in said boxlike body having two different relative physical configurations at two different relative positions and extending the full length of said boxlike body with each being adapted to engage a particular side of an electrical circuit package having a protruding portion of substantially the same relative configuration at the same relative asymmetrical positions on each of two opposite sides to effect alignment within said boxlike body of a series of physically asymmetrical electrical circuit packages each containing an electrical circuit having a physically asymmetrical circuit configuration spatially fixed with respect to the physical asymmetrical package to insure the same and common alignment of the physically asymmetrical circuit configurations; and second differential guideways formed on two opposite sides of said boxlike body normal to said first differential guideways and extending the full length of said boxlike body with one guideway being adapted to engage the flat bottom surface of a physically asymmetrical electrical circuit package and with the other guideway being adapted to enable the protruding portions on the opposite top surface of a physically asymmetrical electrical circuit package to pass through said boxlike body to effect alignment of a series of such physically asymmetrical packages within said boxlike body.